US 6,711,361 B2

(12) United States Patent  
Tanimoto

(10) Patent No.: US 6,711,361 B2
(45) Date of Patent: Mar. 23, 2004

(54) POWER MANAGEMENT SYSTEM IN AN IMAGE FORMING APPARATUS

(75) Inventor: Yoshiyuki Tanimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/219,746

(22) Filed: Aug. 16, 2002

(65) Prior Publication Data

US 2003/0035655 A1 Feb. 20, 2003

(30) Foreign Application Priority Data

Aug. 17, 2001 (JP) ........................................ 2001-247902

(51) Int. Cl.7 .............................................. G03G 15/00
(52) U.S. Cl. ............................................ 399/9; 399/37
(58) Field of Search ............................... 399/9, 88, 75, 399/37

(56) References Cited

U.S. PATENT DOCUMENTS

| 4,538,902 A | 9/1985 | Inuzuka et al. |
| 4,639,864 A | 1/1987 | Katzman et al. |
| 4,740,671 A | 4/1988 | Kuroda et al. |
| 4,782,369 A | 11/1988 | Yasuda et al. |
| 4,785,328 A | 11/1988 | Tanimoto et al. |
| 4,994,852 A | 2/1991 | Matsuuchi et al. |
| 5,124,759 A | 6/1992 | Fukuchi et al. |
| 5,131,079 A | 7/1992 | Miyawaki et al. |
| 5,225,871 A | 7/1993 | Tanimoto |
| 5,325,209 A | 6/1994 | Manabe |
| 5,400,127 A | 3/1995 | Arai et al. |
| 5,552,860 A * | 9/1996 | Yamashita et al. ............. 399/19 |

FOREIGN PATENT DOCUMENTS

JP            61-84661        *  4/1986

* cited by examiner

Primary Examiner—Quana M. Grainger
(74) Attorney, Agent, or Firm—Oblon, Spivak, McClelland, Maier & Neustadt, P.C.

(57) ABSTRACT

An image forming apparatus of the present invention includes a main controller and an engine controller. When an error occurs in an image forming engine, the engine controller sends to the main controller status information representative of original conditions set up before the error and error information representative of the error and causes a second relay to interrupt the application of an AC voltage to a heater controller. The main controller stores the received status information in its memory and turns off a first relay to thereby interrupt the application of the AC voltage to a second power supply. After recovery from the error, the main controller again turns on the first relay and thereby causes the engine controller to restore the original conditions represented by the status information.

7 Claims, 3 Drawing Sheets

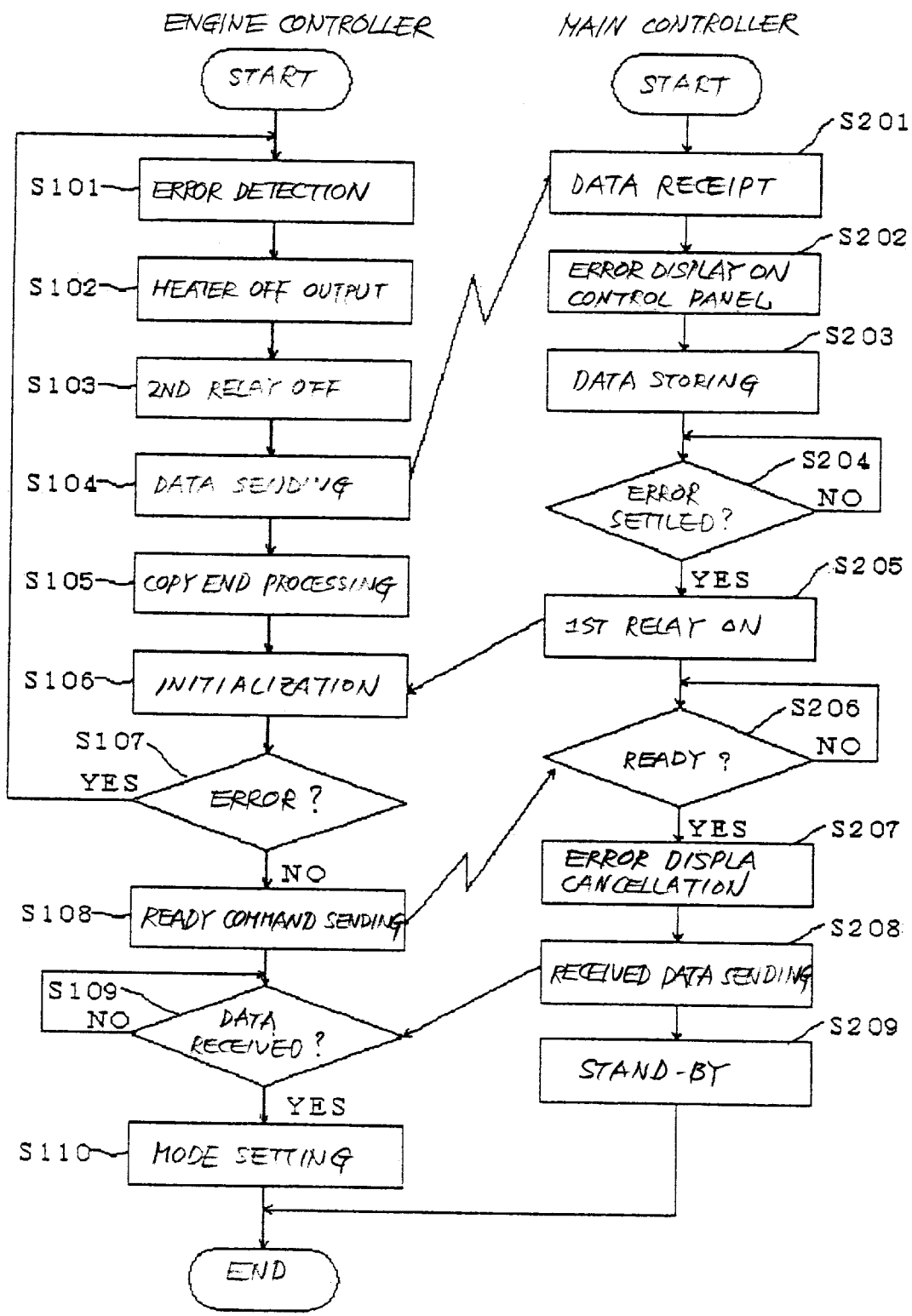

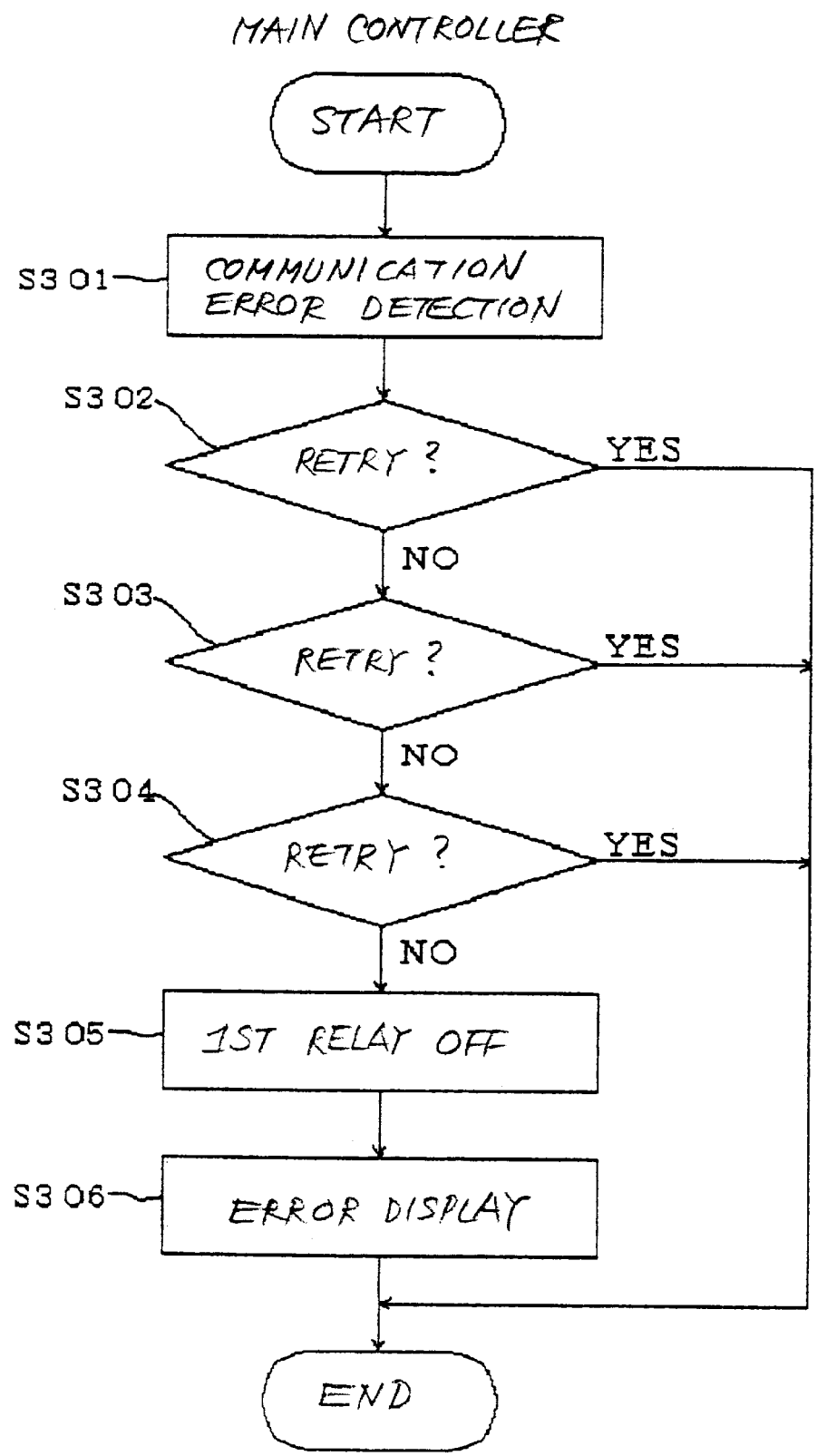

POWER MANAGEMENT SYSTEM IN AN IMAGE FORMING APPARATUS

BACKGROUND OF THE INVENTION

1. Field of the Invention

The present invention relates to an image forming apparatus and more particularly to an image forming apparatus including two power supply lines for insuring safety in the event of a hazardous error and automatically restoring original conditions after recovery from the error.

2. Description of the Background Art

A facsimile apparatus, copier, copier, printer or similar electrophotographic image forming apparatus, for example, includes a fixing unit that fixes a toner image formed on a sheet with heat. More specifically, a latent image is formed on a photoconductive element by a light beam modulated in accordance with image data and then developed by toner. The resulting toner image is transferred from the photoconductive element to a sheet. A heat roller fixes the toner image on the sheet with heat generated by a heater accommodated in the heat roller.

The heater heating the heat roller is controlled to preselected temperature while being protected from overheating. For this purpose, a thermistor, for example, senses the temperature of the heater while sending its output to a controller. The controller ON/OFF controls the heater in accordance with the output of the thermistor to thereby maintain the heater at preselected temperature.

To meet the increasing demand for energy saving, Japanese Patent Laid-Open Publication No. 8-251317, for example, discloses an image forming apparatus configured to reduce power consumption when a power supply is turned off. On the other hand, Japanese Patent Laid-Open Publication No. 2000-289885, for example, teaches an image forming apparatus implemented as a multifunction printer including two power supply lines. If the power supply of a multifunction printer is fully turned off, then the printer cannot receive print data from, e.g., a personal computer or prevents its weekly timer from operating. In light of this, even when the power supply is turned off, the two power supply lines continuously energize part of control sections with a minimum of power and causes, on the generation or a print request or similar request, such a control section to start the entire printer system. This successfully enhances efficient manual operation while saving power.

It is a common practice with an image forming apparatus to cope with, e.g., the runaway of a CPU (Central Processing Unit) or controller by protecting a heater from overheating with a temperature fuse or a thermostat or with an analog comparator. However, this kind of scheme is not a drastic measure for protecting the image forming apparatus in the event of the runaway of the controller or similar critical error. For example, the image forming apparatus is apt to start a fire when a drive motor does not stop rotating, when the heater does not turn off due to the runaway of the CPU or when a high-tension output does not stop. In such a case, even when the CPU is reset, the high-tension output is likely to again turn on. Moreover, when the CPU is reset, all modes set beforehand are deleted and must be set all over again, resulting in inefficient manual operation.

SUMMARY OF THE INVENTION

It is an object of the present invention to provide an image forming apparatus capable of surely turning off power supplies assigned to a charging section and a drive section when critical errors, which are apt to bring about a fire or similar danger, occur in such power supplies, thereby enhancing safety.

It is another object of the present invention to provide an image forming apparatus capable of shutting off power supply when any failure considered to be particularly dangerous occurs, thereby further enhancing efficient operation.

It is a further object of the present invention to provide an image forming apparatus capable of adequately coping with a fire or similar hazardous error to thereby further enhance safety.

An image forming apparatus of the present invention includes a main controller for controlling various sections included in a signal system and an engine controller for controlling various sections included in a load system. A first power supply applies power to the main control means while a second power supply applies power to the engine control means. A first establishing/interrupting device selectively establishes or interrupts the application of power to the second power supply in response to the output of the first power supply. When an error occurs in any one of the sections of the load system, the engine controller sends to the main controller status information representative of original conditions set up before the error and error information representative of the error. On receiving the status information and error information, the main controller stores the status information in its memory and causes the first establishing/interrupting device to interrupt the application of power to the second power supply, thereby interrupting the application of power to the load system.

BRIEF DESCRIPTION OF THE DRAWINGS

The above and other objects, features and advantages of the present invention will become more apparent from the following detailed description taken with the accompanying drawings in which:

FIG. 2 is a flowchart demonstrating a specific operation of the illustrative embodiment; and FIG. 3 is a flowchart representative of another specific operation of the illustrative embodiment.

DESCRIPTION OF THE PREFERRED EMBODIMENT

Figure 1:
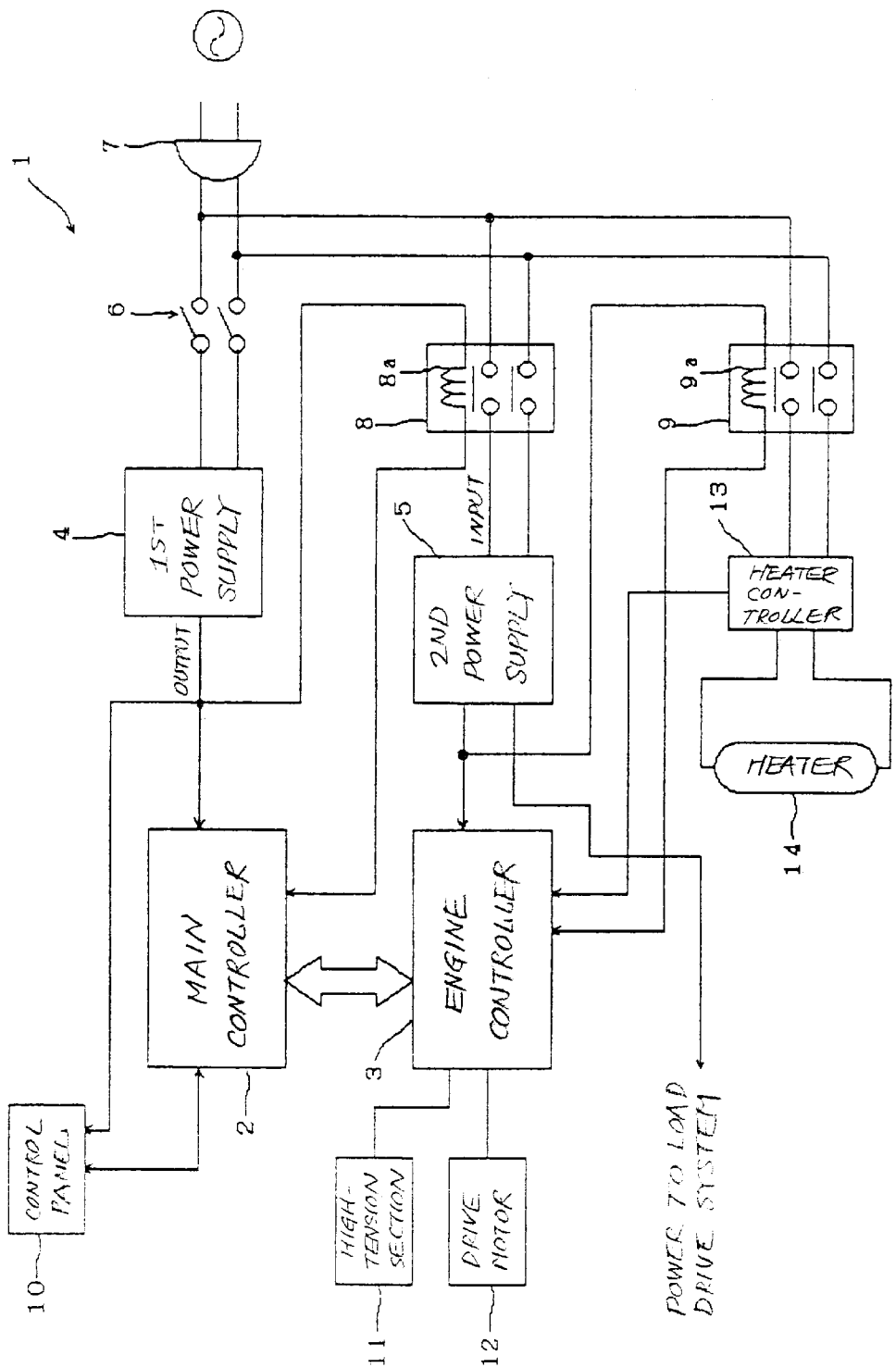
FIG. 1 is a schematic block diagram showing an image forming apparatus embodying the present invention.

Referring to FIG. 1 of the drawings, an image forming apparatus embodying the present invention is shown and generally designated by the reference numeral 1. As shown, the image forming apparatus 1 includes a main controller 2, an engine controller 3, a first power supply 4, a second power supply 5, a main switch 6, a power supply plug 7, a first relay 8, a second relay 9, a control panel 10, a high-tension section 11, a drive motor 12, a heater controller 13, and a heater 14 for fixation. The image forming apparatus 1 additionally includes a sheet feeder and an image forming engine, which includes a charger, an optical writing unit and an image transfer station, although not shown specifically.

Briefly, in the image forming engine, the charger uniformly charges the surface of a photoconductive drum not shown. The optical writing unit scans the charged surface of the drum with a laser beam in accordance with image data to thereby form a latent image. A developing unit develops the latent image with toner for thereby forming a corresponding toner image. The toner image is transferred from the drum to a sheet fed from the sheet feeder at the image transfer station.

When the power supply plug 7 is plugged into the outlet of a commercial power supply, commercial AC 100 V is applied to the image forming apparatus 1. The main switch 6, first relay 8 and second relay 9 are connected to the power supply plug 7. The main switch 6 is connected between the power supply plug 7 and the first power supply 4 and selectively opened or closed by hand.

The first power supply 4 rectifies and adjusts AC 100 V input thereto via the main switch 6 while feeding the resulting DC voltage to the main controller 2 and control panel 10. At the same time, AC 100 V is routed through a drive coil 8a included in the first relay 8 to the main controller 2. The main controller 2 selectively turns on or turns off the first relay 8 by ON/OFF controlling a current to flow through the drive coil 8a.

The main controller 2 includes a CPU, a ROM (Read Only Memory) and a RAM (Random Access Memory) although not shown specifically. The main controller 2 controls the various signal lines of the apparatus 1 in accordance with the operation of the control panel 10 on the basis of a program stored in the ROM, thereby controlling the basic operation of the apparatus 1. Further, the main controller 2 executes protection processing in the event of a critical error, which will be described later specifically. In addition, the main controller 2 controls a display included in the control panel 10.

The control panel 10 includes various keys to be operated by the operator of the apparatus 1 in addition to the display, which may be implemented by an LCD (Liquid Crystal Display). The control panel 10 receives the DC voltage from the first power supply 4 and delivers the contents of operation input on the keys to the main controller 2. At the same time, the control panel 10 displays the contents of operation as well as various kinds of information to be reported by the apparatus 1 to the operator.

The first relay 8, which plays the role of first establishing/ interrupting means, is connected between the power supply plug 7 and the second power supply 5. The main controller 2 selectively turns on or turns off the first relay 8 to thereby establish or interrupt the feed of the AC voltage from the power supply plug 7 to the second power supply 5.

The second power supply 5 rectifies and adjusts the AC voltage input via the first relay 8 while feeding the resulting DC voltage to the engine controller 3 and other loads and drivelines. More specifically, the DC voltage output from the second power supply 5 is routed through a drive coil 9a included in the second relay 9 to the engine controller 3. The engine controller 3 selectively establishes or interrupts a current to flow through the drive coil 9a to thereby turn on or turn off the second relay 9.

The engine controller 3 includes a CPU, a ROM and a RAM and controls, based on a program stored in the ROM and commands received from the main controller 2, the operation of the image forming engine, the feed and conveyance of a sheet, and the high-tension section 11 and drive motor 12 that constitute a drive system. More specifically, the main controller 2 and engine controller 3 are interconnected by a bidirectional communication line and interchange control timing commands with each other.

The second relay 9, which plays the role of second establishing/interrupting means, is connected between the power supply plug 7 and the heater controller 13. The engine controller 3 selectively turns on or turns off the second relay 9 to thereby establish or interrupt the feed of the AC voltage from the power supply plug 7 to the heater controller 13.

The heater controller 13 controls, under the control of the engine controller 3, a current to be fed to the heater 14 in order to control the temperature of a heat roller not shown. The heater 14 is accommodated in the heat roller that is included in a fixing unit.

The operation of the illustrative embodiment will be described hereinafter. The illustrative embodiment is characterized by the previously mentioned protection processing that insures safety in the event of a critical error and then automatically restores original conditions after recovery from the error. More specifically, when the operator turns on the main switch 6, the commercial AC voltage is applied to the first power supply 4 and rectified and adjusted thereby. The resulting DC voltage is fed from the first power supply 4 to the main controller 2 and control panel 10. In response, the CPU of the main controller 2 executes initialization and then turns on the first relay 8 for thereby feeding the commercial AC voltage to the second power supply 5.

The second power supply 5 rectifies and adjusts the commercial AC voltage and feeds the resulting DC voltage to the engine controller 3 and other loads and drivelines. In response, the CPU of the engine controller 3 starts communicating with the main controller 2. After the main controller 2 and engine controller 3 have acknowledged each other, the CPU of the engine controller 3 turns on the second relay 9 to thereby feed the commercial AC voltage to the heater controller 13. As a result, the heater controller 13 starts controlling the temperature of the heater 14.

FIG. 2 demonstrates the protection processing to be executed after the procedure described above. As shown, the engine controller 3 references the outputs of various sensors, not shown, in order to determine whether or not a critical error has occurred (step S101). The critical error refers to, e.g., an occurrence that the high-tension output or the heater 14 does not turn off (OFF) or that the drive motor 12 does not stop rotating. If such an error has occurred, the engine controller 3 delivers a signal for interrupting the current being fed to the heater 14 to the heater controller 13 (step S102). In response, the heater controller 13 turns off the second relay 9 (step S103).

Assume that the error detected is an ordinary error that does not start a fire or similar hazard, e.g., a sheet jam. Then, the engine controller 3 executes usual error processing without turning off the second relay 9.

After turning off the second relay 9, the engine controller 3 sends to the main controller 2 an error code representative of the critical error and status information including current modes (e.g. copying conditions) and data representative of the number of remaining copies to be output or remaining job (step S104). The engine controller 3 then executes usual processing for stopping copying operation (step S105).

On receiving the error code and status information from the engine controller 3 (step S201), the main controller 2 displays an error message on the display of the control panel 10 (step S202), stores the received data in the RAM or similar memory thereof, and then turns off the first relay 8 (step S203).

A service person, for example, is urged by the error message appearing on the control panel 10 to settle the error and then operate a switch, not shown, positioned on the control panel 10 for indicating recovery (OK). The main controller 2 determines whether or not the error has been settled (step S204). If the answer of the step S204 is YES, then the main controller 2 turns on the first relay 8 and sends a recovery command representative of the recovery from the error to the engine controller 3 (step S205). The main controller 2 then determines whether or not it has received a ready command from the engine controller 3 (step S206).

On receiving the recovery command from the main controller 2, the engine controller 3 executes initialization (step S106) and then determines whether or not the error has been settled (step S107). If the answer of the step S107 is NO, then the steps S101 through S107 are repeated. If the answer of the step S107 is NO, then the engine controller 3 sends the ready command to the main controller 2 (step S108) and then waits for the status information from the main controller (step S109).

On receiving the ready command from the engine controller 3 (YES, step S206), the main controller 2 cancels the error message appearing on the control panel 10 (step S207). Subsequently, the main controller 2 sends the status information stored in the memory in the step S201 to the engine controller 3 (step S208) and then remains in a stand-by state (step S209).

In response to the status information (YES, step S109), the engine controller 3 restores the original operation modes selected before the error, waits until the operator presses a start button, not shown, positioned on the control panel 10, and then causes image formation to start (step S110).

FIG. 3 shows protection processing to be executed by the main controller 2 when an error occurs in communication between the main controller 2 and the engine controller 3. As shown, when the main controller 2 detects a communication error (step S301), it repeats a retry for requesting a command up to three times in consideration of the influence of, e.g., noise (steps S302 through S304). If the retry is successful (YES, step S302, 303 or 304), then the main controller 2 executes the processing described with reference to FIG. 2.

If even the last retry is unsuccessful (NO, step S304), then the main controller 2 turns off the first relay 8 by determining that the CPU of the engine controller 3 has run away (step S305). The main controller 2 then displays a communication error on the display of the control panel 10 (step S306). As a result, the application of the commercial AC voltage to the second power supply 5 is interrupted, so that the heater 14 and all the loads are turned off. This surely, safely interrupts the operation of the apparatus 1 although a sheet may be left on a conveyance path inside the apparatus 1.

In summary, it will be seen that the present invention provides an image forming apparatus capable of surely turning off power supplies assigned to a charging section and a drive section when critical errors, which are apt to bring about a first or similar hazard, occur in such power supplies, thereby enhancing safety. Further, the apparatus of the present invention automatically restores original conditions after recovery from the error for thereby enhancing efficient manual operation to follow.

Various modifications will become possible for those skilled in the art after receiving the teachings of the present disclosure without departing from the scope thereof.

What is claimed is:

1. An image forming apparatus comprising:
   main control means for controlling various sections included in a signal system;
   engine control means for controlling various sections included in a load system;
   a first power supply for applying power to said main control means;
   a second power supply for applying power to said engine control means; and
   first establishing/interrupting means for selectively establishing or interrupting application of the power to said second power supply in response to an output of said first power supply;
   wherein when an error occurs in any one of the sections of the load system, said engine control means sends to said main control means status information representative of original conditions set up before said error and error information representative of said error, and
   on receiving the status information and the error information, said main control means stores said status information in a memory thereof and causes said first establishing/interrupting means to interrupt the application of the power to said second power supply, thereby interrupting the application of the power to the load system.

2. The apparatus as claimed in claim 1, further comprising second establishing/interrupting means for selectively establishing or interrupting the application of the power to the load system in response to an output of said second power supply.

3. The apparatus as claimed in claim 2, wherein when said first establishing/interrupting means applies the power to said second power supply after interruption of the application of the power to said load system, said main control means sends the status information stored to said engine control means, causing said engine control means to control said load system in accordance with said status information.

4. The apparatus as claimed in claim 3, wherein the sections of the load system comprise at least fixing means, high-tension means, and a drive motor.

5. A device for controlling application of power, comprising:
   first control means for controlling application of power to signal circuitry;
   second control means for controlling application of power to signal load circuitry;
   a first power supply for applying power to said first control means;
   a second power supply for applying power to said second control means; and
   establishing/interrupting means connected between an AC power supply and an input of said second power supply for selectively establishing or interrupting the application of the power to said second power supply;
   wherein when an error occurs in the load circuitry, said second control means detects said error and sends error information to said first control means, and
   in response to the error information, said first control means turns off said establishing/interrupting means to thereby interrupt the application of power to said second power supply and said load circuitry connected to said second power supply.

6. An image forming apparatus comprising:
   main control means for controlling various sections included in a signal system;
   engine control means for controlling various sections included in a load system;
   a first power supply for applying power to said main control means;
   a second power supply for applying power to said engine control means;
   first establishing/interrupting means for selectively establishing or interrupting application of the power to said second power supply in response to an output of said first power supply; and second establishing/interrupting means for selectively establishing or interrupting the application of the power to the load system in response to an output of said second power supply, wherein when an error occurs in any one of the sections of the load system, said engine control means sends to said main control means status information representative of original conditions set up before said error and error information representative of said error, on receiving the status information and the error information, said main control means stores said status information in a memory thereof and causes said first establishing/interrupting means to interrupt the application of the power to said second power supply, thereby interrupting the application of the power to the load system, when said first establishing/interrupting means applies the power to said second power supply after interruption of the application of the power to said load system, said main control means sends the status information stored to said engine control means, causing said engine control means to control said load system in accordance with said status information, the sections of the load system comprise at least fixing means, high-tension means, and a drive motor, and only when an error occurs in any one of the fixing means, the high-tension means and the drive motor, said engine control means send the error information representative of said error to said main control means, causing said main control means to interrupt the application of the power to said second power supply via said first establishing/interrupting means.

7. The apparatus as claimed in claim 6, wherein on detecting an error in interchange of information between said main control means and said engine control means, said main control means causes said first establishing/interrupting means to interrupt the application of the power to said second power supply.

\* \* \* \* \*